(12) United States Patent
Gokavarapu et al.

(10) Patent No.: US 11,418,583 B2
(45) Date of Patent: Aug. 16, 2022

(54) TRANSACTION PROCESS MANAGEMENT BY DYNAMIC TRANSACTION AGGREGATION

(71) Applicant: INTERNATIONAL BUSINESS MACHINES CORPORATION, Armonk, NY (US)

(72) Inventors: Nageswararao V. Gokavarapu, Bangalore (IN); Jithesh Moothoor, Bangalore (IN); Raghavendran Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/896,658

(22) Filed: Feb. 14, 2018

(65) Prior Publication Data
US 2019/0253488 A1 Aug. 15, 2019

(51) Int. Cl.
| H04L 67/1008 | (2022.01) |
| H04L 67/60 | (2022.01) |
| H04L 67/566 | (2022.01) |
| G06F 9/50 | (2006.01) |

(52) U.S. Cl.
CPC ........ *H04L 67/1008* (2013.01); *G06F 9/5083* (2013.01); *H04L 67/566* (2022.05); *H04L 67/60* (2022.05)

(58) Field of Classification Search
CPC . H04L 67/1008; H04L 67/2833; H04L 67/32; G06F 9/5083
See application file for complete search history.

(56) References Cited

U.S. PATENT DOCUMENTS

| 7,707,581 | B2 | 4/2010 | Inoue | |
| 9,300,523 | B2 | 3/2016 | Alon et al. | |
| 2005/0071307 | A1* | 3/2005 | Snyder | G06F 9/466 |
| 2005/0216404 | A1* | 9/2005 | Sims | G06Q 20/02 705/40 |
| 2009/0064147 | A1* | 3/2009 | Beckerle | G06F 9/466 718/101 |
| 2011/0029657 | A1* | 2/2011 | Gueta | H04L 43/028 709/224 |
| 2011/0154018 | A1* | 6/2011 | Edstrom | H04L 67/2833 713/151 |
| 2012/0117075 | A1* | 5/2012 | Gokulakannan | G06F 16/24532 707/741 |
| 2014/0195689 | A1* | 7/2014 | Gill | H04L 67/2833 709/226 |
| 2018/0181895 | A1* | 6/2018 | Singh | G06Q 40/12 |
| 2018/0329705 | A1* | 11/2018 | Laredo | G06F 9/547 |
| 2020/0278884 | A1* | 9/2020 | Tucker | H04L 67/32 |

OTHER PUBLICATIONS

Mell et al., "The NIST Definition of Cloud Computing", NIST, Sep. 2011, 7 Pages, Special Publication 800-145, U.S. Department of Commerce, Gaithersburg, MD.

* cited by examiner

*Primary Examiner* — John B Walsh
*Assistant Examiner* — Steven C Nguyen
(74) *Attorney, Agent, or Firm* — Kristofer L. Haggerty (57) ABSTRACT

A method for dynamic transaction request grouping and allocation in a distributed transaction processing system. The method may implement interconnected transaction process monitors to manage the handling and servicing of transaction requests with respect to networked computing platforms of the distributed transaction processing system.

18 Claims, 6 Drawing Sheets

TRANSACTION PROCESS MANAGEMENT BY DYNAMIC TRANSACTION AGGREGATION

BACKGROUND

The present invention relates generally to workload management and load balancing in a data processing system, and in particular to transaction process monitoring and management in a transaction processing system.

Various database management systems exist for use in controlling storage, access, distribution, and modification of data stored in a database, to thereby provide and maintain security, integrity, and concurrency of the data, such as for use in various financial transaction or exchange, or the like. For example, an online transaction processing system may be implemented to support and facilitate database transaction operations as such may be performed in a database with respect to database or transaction requests, to achieve and maintain atomicity, consistency, isolation, and durability of the transactions. The database operations may be performed by transaction-oriented applications, and the like. The transaction-oriented applications may consistently be subjected to high throughput operating conditions, as numerous requests may be received from numerous clients and users for concurrent processing. Multiple instances of the same transaction-oriented application may be invoked by and implemented in processing many of the transaction requests.

SUMMARY

According to an aspect of the present invention, a method for dynamic transaction request grouping and allocation in a transaction processing system. The method may implement interconnected transaction process monitors to manage the handling and servicing of transaction requests with respect to networked computing platforms of the transaction processing system.

According to an aspect of the present invention, a computer system is provided. The computer system may include one or more computer processors, one or more computer-readable storage media, and program instructions stored on one or more of the computer-readable storage media for execution by at least one of the one or more computer processors. The program instructions may be executed to perform the disclosed method.

According to an aspect of the present invention, a computer program product is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

A transaction processing system may be implemented to concurrently service database transaction requests as such may be received by the system in high volumes from various clients or users. Each of the requests may be individually and respectively associated with a corresponding client by way of unique client data. The transaction processing system may provide a limited range of transaction-oriented services in response to the requests, such as may relate to financial services, order entry services, or the like. While the requests may collectively require servicing by various different transaction processing applications, portions of the requests may invoke and be serviced by a single type of application, such as by way of multiple instances of the application.

The transaction processing system may include a transaction processing environment in which a workload or transaction management scheme may be applied to facilitate handling and servicing of the requests, as well as to support scaling and availability of the system. The transaction processing environment may include, for example, one or more computing platforms or nodes for receiving and routing the requests for servicing, and communicating serviced requests to clients. The nodes may include those upon which transaction-oriented applications reside for execution in servicing or processing the requests, as well as for updating data stored in the system to reflect the serviced requests, accordingly. The transaction management scheme may implement middleware such as a transaction processing monitor. The handling and servicing may include, for example, communication of the requests between interconnected nodes over a network, communication of the requests between threads of a multithreaded computing node, communication of the requests between central processing units (CPUs) of a multi-processor computing node, and so on.

Embodiments of the present invention are directed to a method, system, and computer program product for dynamic transaction request grouping and allocation in a transaction processing system. The method may implement interconnected transaction process monitors for managing the handling and servicing of transaction requests by transaction-oriented applications, and the like, as may be hosted by one or more computing platforms of the system.

Advantageously, the method may be implemented in a processing environment of a database management system to increase system throughput and availability, and reduce transaction request rejection rates during peak system loading, particularly under operating conditions in which the system may be subjected to high workloads, and high throughput may be required. In an aspect, the method may increase system throughput and availability by sequencing a group of transaction requests for sequential processing by a single type of transaction oriented application, thread, process, or the like, as such may be hosted or executed by a computing platform or node. The sequential processing of the requests by the single type of application may reduce computing resources consumed by context-switching operations that would otherwise be performed by the node in servicing, for example, an un-sequenced group of requests where portions of the requests may respectively require different applications for servicing, causing loading and unloading of various applications in servicing the requests. Further, the sequential processing of the requests may also reduce the transaction request rejection rates by the system, as such may be caused by overloaded or unavailable nodes. Accordingly, the method may be implemented to increase system throughput, availability, and efficiency, as well as to reduce system operating costs and waste. Further, the group of transaction requests may be communicated, for example, between nodes, processes, or threads, alleviating networking or communication loads in the system. Additional advantages of the present invention may be readily apparent to those of skill in the art as described herein.

Figure 1:
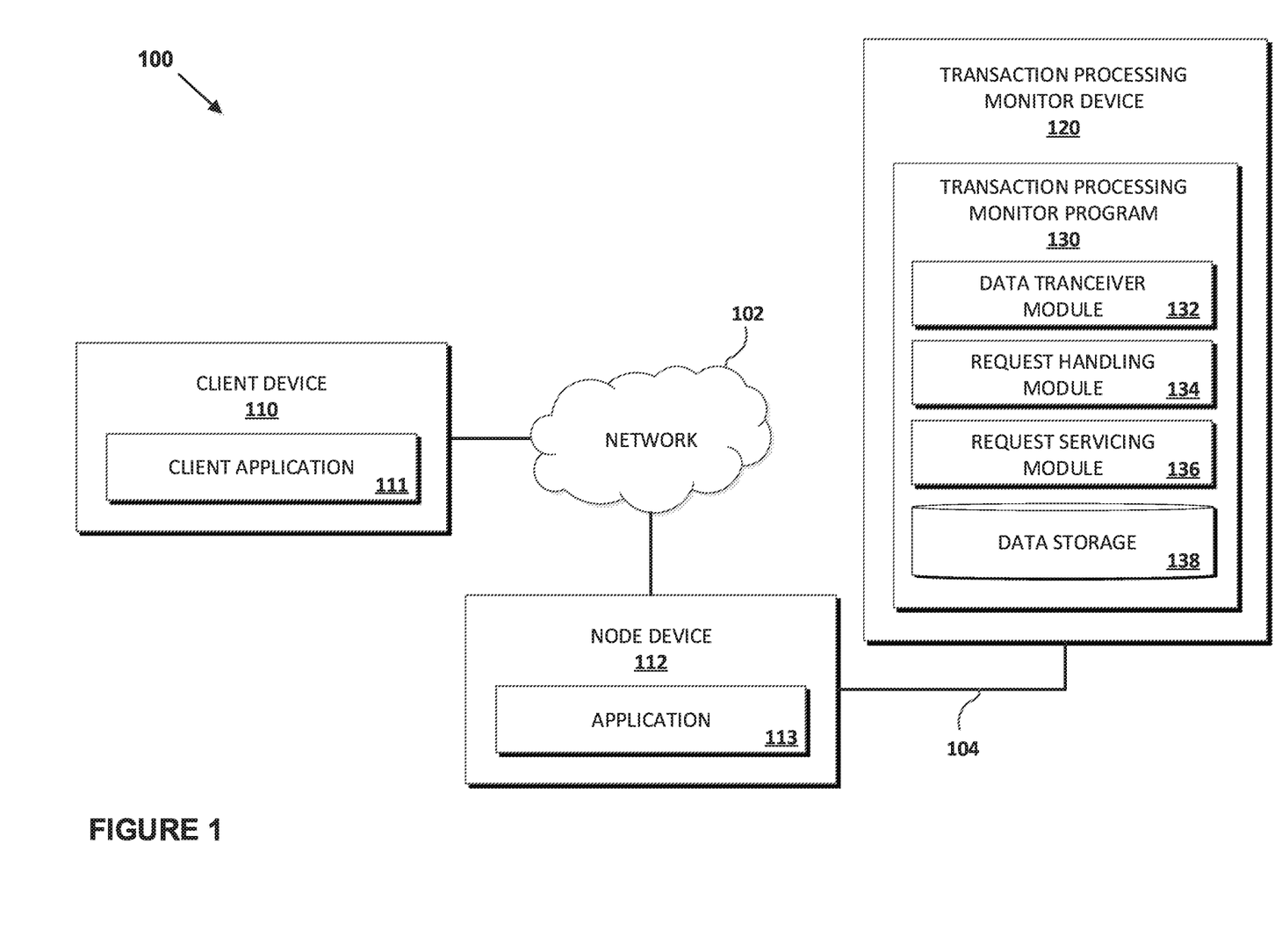
FIG. 1 is a functional block diagram depicting a data processing system, in accordance with an embodiment of the present invention.

FIG. 1 is a functional block diagram depicting data processing system 100, in accordance with an embodiment of the present invention. Data processing system 100 may represent, for example, a transaction processing system such as an online transaction processing system. Data processing system 100 may include client device 110, node device 112, and transaction processing monitor device 120. Client device 110 may communicate with node device 112 by way of network 102. Transaction processing monitor device 120 may communicate with node device 112 by way of data transmission channel 104. While FIG. 1 depicts three discrete devices in data processing system 100, other arrangements may be contemplated. For example, client device 110, node device 112, or transaction processing monitor device 120 may include one or more integrated or distinct devices. In particular, data processing system 100 may include one or more client devices such as client device 110, and one or more node devices such as node device 112.

In various embodiments of the present invention, network 102 and data transmission channel 104 respectively represent, for example, an intranet, a local area network (LAN), a personal area network (PAN), a wireless local area network (WLAN), a wireless personal area network (WPAN), a wide area network (WAN) such as the Internet, or the like, and may respectively include wired, wireless, or fiber optic connections. In general, network 102 and data transmission channel 104 may respectively be any combination of connections and protocols that may support communications between client device 110, node device 112, and transaction processing monitor device 120, in accordance with embodiments of the present invention. In the various embodiments, network 102 may be, for example, the Internet, representative of a worldwide collection of networks and gateways that may support communications between devices connected to the Internet. In the various embodiments, data transmission channel 104 may be, for example, a private network, representative of a private collection of networks and gateways that may support communications between devices connected thereto.

In various embodiments of the present invention, client device 110, node device 112, and transaction processing monitor device 120 respectively represent individual or integrated computing platforms, such as a wearable device, an implantable device, a smart phone, a tablet computer, a laptop computer, a desktop computer, a computer server, a virtual machine, or the like. In the various embodiments, client device 110, node device 112, or transaction processing monitor device 120 may otherwise be any type of computing platform, computing system, or information system capable of sending and receiving data to and from another device, such as by way of network 102. Client device 110, node device 112, or transaction processing monitor device 120 may include internal and external hardware components, as described with reference to FIG. 3. In other embodiments, client device 110, node device 112, or transaction processing monitor device 120 may be implemented in a cloud computing environment, as described with reference to FIGS. 4 and 5.

In an embodiment of the present invention, client device 110 may include, for example, a client computing platform that hosts an application or program such as client application 111. Client device 110 may implement a combination of devices and technologies such as network devices and corresponding device drivers, to support the operation of client application 111, and to provide a platform enabling communications between client device 110 and node device 112, in accordance with embodiments of the present invention.

Client application 111 may be a program such as a software program, one or more subroutines contained in a program, an application programming interface, or the like. In embodiments of the present invention, applications such as client application 111 may communicate transaction requests, such as by way of network 102, to computing platforms or node devices such as node device 112 for servicing.

In an embodiment of the present invention, node device 112 may include, for example, a computing platform or node such as an application or database server that hosts an application or program such as application 113. In the embodiment, node device 112 may additionally include, for example, a networking or telecommunications node that may be implemented in receiving and transmitting data over network 102. Node device 112 may implement a combination of devices and technologies, such as network devices and corresponding device drivers, to support the operation of application 113, and to provide a platform enabling communications between client device 110, node device 112, and transaction processing monitor device 120, in accordance with embodiments of the present invention.

Application 113 may be a program such as a software program, one or more subroutines contained in a program, an application programming interface, a networking interface, or the like. In embodiments of the present invention, application 113 may be, for example, a transaction-oriented application that may be implemented to service or process transaction requests as received in data processing system 100, to generate serviced transaction requests corresponding to each respective request for communication to clients such as client application 111. In the embodiments, application 113 may otherwise be, for example, a network interface that may be implemented in handling and communicating transaction requests, serviced transaction requests, and the like.

In an embodiment of the present invention, transaction process monitoring device 120 may include, for example, a host computing platform or node that hosts an application or program such as transaction processing monitor program 130. Transaction processing monitor device 120 may implement a combination of devices and technologies, such as network devices and corresponding device drivers, to support the operation of transaction processing monitor program 130, and to provide a platform enabling communications between node device 112 and transaction processing monitor device 120, in accordance with embodiments of the present invention.

Transaction processing monitor program 130 may be a program such as a software program, one or more subroutines contained in a program, an application programming interface, or the like. In embodiments of the present invention, applications such as transaction processing monitor program 130 may include, for example, a control program or controller such as a transaction processing monitor, a teleprocessing monitor, or the like. Transaction processing monitor program 130 may include data transceiver module 132, request handling module 134, request servicing module 136, and data storage 138.

In an embodiment of the present invention, node device 112 may include, for example, one or more interconnected computing platforms or nodes that may be present in a transaction processing environment of data processing system 100. In the embodiment, node device 112 may further include, for example, one or more interconnected networking nodes that may be present in the environment. In the embodiment, node device 112 may include nodes such as transaction handling nodes for routing the requests for servicing, transaction servicing nodes for hosting and implementing transaction-oriented applications in servicing or processing the requests, and client communication nodes for receiving the requests from clients and communicating serviced requests to the clients in response. In the embodiment, a transaction-oriented application such as application 113 may be implemented to, for example, service or process a transaction request to generate a serviced transaction request response, such as for responsive communication to a corresponding client associated with the request. In the embodiment, transaction processing monitor program 130 may communicate with and be implemented in or with respect to one or more of the nodes in the environment to provide transaction process monitoring and management with respect to transaction requests received in the environment. For example, interconnected instances of transaction processing monitor program 130 may be implemented with respect to particular clusters of one or more nodes in the environment to coordinate operations between each cluster.

In an embodiment of the present invention, the transaction servicing nodes may include, for example, application or database servers having multiprocessing or multithreading computing architectures and environments. In the embodiment, transaction processing monitor program 130 may monitor and manage execution of threads or processes by one or more central processing units or processing cores of the transaction servicing nodes in the servicing of a transaction request. In the embodiment, the transaction handling nodes and the client communication nodes may include, for example, networking nodes, routers, and the like, for communicating data with other nodes in the environment, and for communicating data with clients such as client application 111, accordingly. The individual nodes may support and facilitate transaction processing by enabling transaction handling, transaction servicing, and client communication functionality in data processing system 100.

In an embodiment of the present invention, one or more instances of transaction processing monitor program 130 may be implemented in the environment of data processing system 100 to enable dynamic transaction request grouping and allocation, workload management, and load balancing in the environment with respect to transaction requests received in the system and operating conditions of individual nodes. In the embodiment, the instances of transaction processing monitor program 130 may be implemented in coordination with one or more other instances, for example, to enable monitoring and management of transaction processing operations performed by clusters of one or more nodes in the environment, and to distribute a workload among the implemented instances, accordingly.

Data transceiver module 132 enables communications between transaction processing monitor program 130 and one or more of the nodes of data processing system 100, such as represented by node device 112. In an embodiment of the present invention, data transceiver module 132 may also enable communications between individual instances of transaction processing monitor program 130. Data transceiver module 132 may store data in data storage 138 for later retrieval and use, such as in the form of separate computer-readable data files, or the like.

Request handling module 134 generates transaction processing instructions for communication to and execution by one or more of the nodes in the environment of data processing system 100. In an embodiment of the present invention, the transaction processing instructions may include, for example, transaction request grouping and handling instructions. In the embodiment, the transaction request grouping and handling instructions may be executed, for example, by a transaction handling node in grouping and routing a set of transaction requests with respect to a transaction servicing node for servicing. In the embodiment, the transaction processing instructions may further include, for example, serviced transaction request grouping and handling instructions. In the embodiment, the serviced transaction request grouping and handling instructions may be executed, for example, by a transaction handling node in grouping and routing a set of the serviced transaction requests with respect to a client communication node for communication of individual serviced transaction requests to corresponding clients, such as client application 111.

Request servicing module 136 generates transaction servicing instructions for communication to and execution by one or more of the nodes in the environment of data processing system 100. In an embodiment of the present invention, the transaction servicing instructions may include, for example, transaction request scheduling, grouping, and sequencing instructions. In the embodiment, the transaction request scheduling, grouping, and sequencing instructions may be, for example, executed by a transaction handling node in scheduling transaction requests for sequential servicing by one or more transaction servicing nodes.

Figure 2A:
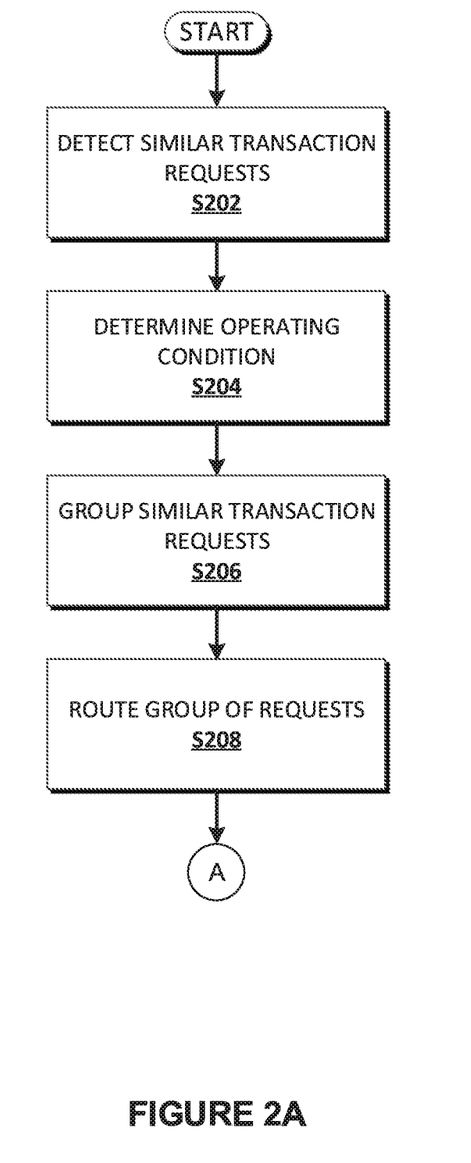
FIGS. 2A and 2B are flowcharts depicting operational steps of an aspect of the data processing system, in accordance with an embodiment of the present invention.
Figure 2B:
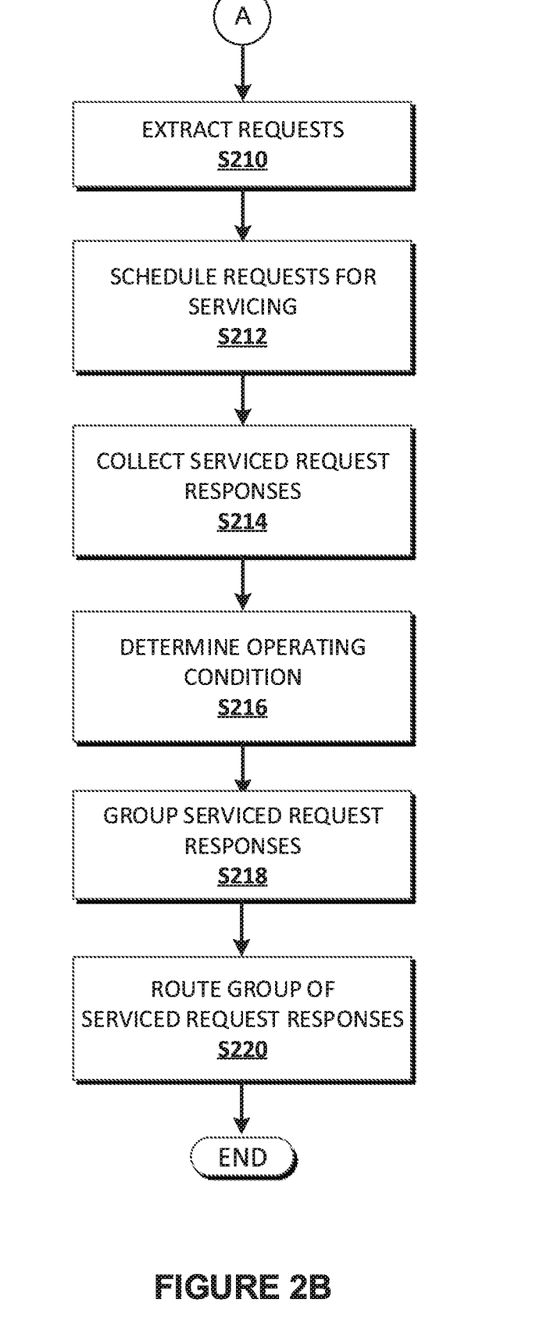

FIGS. 2A and 2B are flowcharts depicting operational steps of an aspect of data processing system 100, in accordance with an embodiment of the present invention.

With reference to FIG. 2A, request handling module 134 generates transaction processing instructions for communication to and execution by one or more of the nodes in the environment of data processing system 100, for handling of the transaction requests in and with respect to the environment, accordingly. In an embodiment of the present invention, the nodes may include, for example, transaction handling nodes and client communication nodes.

At step S202, similar transaction requests may be detected. The requests may be received from clients such as client application 111 by a cluster of one or more nodes such as the client communication nodes in the environment of data processing system 100. In an embodiment of the present invention, the similar transaction requests may be detected based on a common transaction request characteristic or servicing requirement. In the embodiment, the transaction request characteristic may include, for example, a specification of a particular transaction-oriented application that may be invoked or implemented in servicing a corresponding request. In the embodiment, the transaction request characteristic may further include, for example, a specification or requirement as to a preferred or required processing security level of a request, node or application specifications and computing resources available for servicing the request, and the like. In the embodiment, the transaction request characteristic may be specified, for example, by a service level agreement associated with a request. In the embodiment, the service level agreement may specify various servicing requirements associated with the request, such as in terms of servicing or processing metrics, security metrics, and the like. In the embodiment, the transaction request characteristic may further include, for example, client identification data corresponding to a client associated with a request. In the embodiment, the similar transaction requests may be detected based on, for example, a number of transaction request characteristics common to a group of requests, where the number of common characteristics exceeds a predetermined threshold.

In an example, a batch of similar transaction requests may be detected based on one or more transaction request characteristics common to each of the requests. One or more of the transaction request characteristics may specify a particular transaction-oriented application that may be invoked or implemented in servicing the requests. For example, characteristics may apply to terms of a particular industry, field, business, or function such as finance, sales or data order entry, airline reservation, payroll, employee records, manufacturing, shipping, logistics, and so on. The particular transaction-oriented application that may additionally or alternatively be implemented, for example, for a particular application version, client or servicing tier, and so on. The common transaction request characteristics may additionally specify a preferred or required processing security level of the requests. As such, in the example, the batch of similar transaction requests may be detected based on a common transaction-oriented application that may be implemented in servicing each of the requests, as well as a commonly preferred or required processing security level associated with the requests. Various combinations of other types of transaction request characteristics of the requests may additionally or alternatively be used in detecting the similar transaction requests, which may be chosen as a matter of design.

At step S204, operating conditions of a cluster of one or more transaction servicing nodes in the environment of data processing system 100 may be determined. In an embodiment of the present invention, an operating condition may be determined with respect to one or more transaction request characteristics, communication requirements, and servicing requirements associated with the similar transaction requests. For example, an operating condition may be determined with respect to a transaction servicing node which hosts a transaction-oriented application that may be implemented in servicing the similar transaction requests, as such may be specified by a transaction request characteristic common to the similar requests. In the embodiment, the operating condition may further be determined with respect to a servicing capacity and availability of a transaction-oriented application as such may be hosted by a corresponding node in the environment. In the embodiment, the servicing capacity and availability of the transaction-oriented application may be determined based on, for example, an operational or network status of an application or a corresponding node by which the application may be hosted, a transaction request servicing queue length, a security level, an amount of computing resources available for servicing the requests, historical transaction request servicing times and success rates, and the like. For example, the servicing capacity and availability may include an operational or network status of an application or a corresponding node by which the application may be hosted, and an amount of available computing resources available for servicing the requests, and so on. The operating conditions associated with the transaction-oriented application and corresponding node by which the application may be hosted may otherwise be determined with respect to any other type of operating status, workload condition, workload capacity, or the like, as such may affect the operation of the application or node, accordingly.

At step S206, the detected similar transaction requests may be grouped or aggregated with respect to a selected transaction servicing node for handling and subsequent servicing. In an embodiment of the present invention, the selected transaction servicing node may include, for example, a transaction servicing node by which a transaction-oriented application may be hosted which may be implemented in servicing each of the similar transaction requests. In the embodiment, the transaction servicing node may further be selected based on a level of compatibility of the node, hosted application, or both, with respect to one or more other transaction request characteristics common to the requests, such as determined at step S202. In the embodiment, the transaction servicing node may be selected dynamically, based on the determined operating conditions of the node, as determined at step S204. For example, given an amount of applied workload with respect to a cluster of nodes including the transaction servicing node, the selection may be made based on a minimum applied workload to the selected node, relative to that of the other nodes in the cluster at the point in time during which the selection is made. In the embodiment, the selected transaction servicing node may include, for example, a servicing capacity and availability suitable for supporting the transaction-oriented application implemented in sequentially servicing the requests, as such may be determined based on the determined operating conditions of the node at step S204. In the embodiment, the requests may be grouped for sequential in tandem servicing by the transaction-oriented application hosted by the node. In the embodiment, the requests may be grouped to minimize context-switching operations performed by the transaction servicing node during servicing of the requests. In the embodiment, the requests may be grouped with respect to one or more selected transaction servicing nodes.

At step S208, the grouped transaction requests may be routed with respect to the selected transaction servicing node for servicing. In an embodiment of the present invention, the grouped transaction requests may be routed in the environment by nodes such as the transaction handling nodes, with respect to a cluster of one or more nodes such as the transaction servicing nodes. For example, the grouped transaction requests may be routed by way of data packets communicated over a packet-switched network by which communications between the nodes in the environment of data processing system 100 may be implemented. The requests may be routed, for example, by implementing a vector-based algorithm compatible with a distance-vector routing protocol of the network. The vector-based algorithm may include, for example, the Bellman-Ford algorithm, the Ford-Fulkerson algorithm, the diffusing update algorithm, or the like. The requests may otherwise be routed in accordance with any type of routing or communications protocol as may be implemented in the environment.

In an embodiment of the present invention, the grouped transaction requests may be routed for servicing, for example, by way of data packets. In the embodiment, each data packet may include, for example, a header and a payload, and each header and payload of each data packet may include data corresponding to one or more of the grouped requests. In the embodiment, a header field of each data packet may include, for example, a transaction request identifier corresponding to one or more of the grouped requests, as well as a group identifier corresponding to the grouped transaction requests collectively. In the embodiment, the transaction request identifier and the group identifier may be inserted into the header of each data packet, for example, by the transaction handling node implemented in handling the requests. In the embodiment, the identifiers may be inserted by the transaction handling node in accordance with transaction processing instructions, as received from an instance of transaction processing monitor program 130. The transaction processing instructions may be generated, for example, by request handling module 134. In the embodiment, the group identifier may associate each request with the group, and may include, for example, an indication as to a number of requests in the group, an indication as to one or more of the transaction request characteristics common to the group, and the like. Generally, the group identifier may include data for identifying or representing each of the grouped transaction requests or aspects thereof, such as in terms of one or more of the transaction request characteristics, in order to facilitate workload management and load balancing in the environment.

With reference to FIG. 2B, request servicing module 136 generates transaction processing instructions for communication to and execution by one or more of the nodes in the environment of data processing system 100, for servicing transaction requests and communicating serviced transaction requests in and with respect to the environment, accordingly. In an embodiment of the present invention, the nodes may include, for example, transaction servicing nodes.

At step S210, the grouped transaction requests may be extracted for servicing. The requests may be received from the cluster of client communication nodes, by a cluster of one or more nodes such as the transaction servicing nodes. In an embodiment of the present invention, the grouped transaction requests may be extracted from the data packets based on the transaction request identifiers and the group identifier.

At step S212, the extracted group of transaction requests may be scheduled for servicing. In an embodiment of the present invention, the transaction requests may be scheduled for sequential in tandem servicing by a transaction-oriented application, as such may be specified by, for example, the group identifier corresponding to the grouped transaction requests, or individual transaction request identifiers corresponding to a subgroup of the transaction requests. In the embodiment, the transaction requests may otherwise be scheduled for sequential in tandem servicing by a transaction-oriented process or thread. The transaction-oriented application, process, or thread may be hosted or executed by a corresponding transaction servicing node. In the embodiment, the transaction requests may be scheduled based on one or more of the operating condition of the transaction servicing node, the operating condition of the transaction-oriented application hosted by the transaction servicing node, and the operating condition of the transaction-oriented process or thread. In the embodiment, the transaction requests may additionally or alternatively be scheduled based on other of the transaction request characteristics or processing requirements of the extracted requests, as described with reference to step S202. In the embodiment, a serviced transaction request response may be generated by the specified transaction-oriented application for each scheduled transaction request, accordingly.

In an embodiment of the present invention, the transaction requests may be scheduled to minimize context-switching operations performed by the one or more transaction servicing nodes during servicing of the requests. In the embodiment, the scheduling of the transaction requests may include, for example, synchronous or asynchronous scheduling of the requests for servicing with respect to one or more dynamically selected transaction servicing nodes, such as based on individual operation conditions of one or more nodes of a cluster of transaction servicing nodes in the environment. For example, a subgroup of transaction requests may be scheduled for sequential in tandem servicing by a first transaction-oriented application based on a determined operating condition of a first node at a given point in time indicative of high availability of the first application and the first node. Meanwhile, another subgroup of transaction requests may be scheduled for sequential in tandem servicing by a second transaction-oriented application at a later time, based on a determined operating condition of a second node at the given point in time indicative of low availability of the second application and the second node.

In an embodiment of the present invention, subgroups of the transaction requests may be scheduled for sequential in tandem servicing with respect to one or more corresponding transaction-oriented applications, as such may be specified by, for example, the individual transaction request identifiers corresponding to each of the transaction requests in each subgroup. In the embodiment, the subgroups of the transaction requests may be scheduled based on operating conditions of the nodes in the cluster at the time of scheduling, as such may have changed during routing of the requests. In the embodiment, where it may be determined, such as by an instance of transaction processing monitor program 130, that scheduling the subgroups of the transaction requests may facilitate load workload management and load balancing in the environment, such may be determined in a manner similar to that described with reference to step S204.

At step S214, serviced transaction request responses may be collected or aggregated with respect to one or more client communication nodes for client communication to associated clients. In an embodiment of the present invention, the serviced transaction request responses may be collected, for example, based on the transaction request characteristics of the transaction requests respectively corresponding to each of the serviced transaction request responses. In the embodiment, The serviced request responses may be collected in a manner similar to the grouping of the initial transaction requests, as described with reference to step S206.

At step S216, operating conditions of a cluster of one or more client communication nodes in the environment of data processing system 100 may be determined. In an embodiment of the present invention, an operating condition may be determined with respect to one or more of the transaction request characteristics, communication requirements, and servicing requirements associated with the requests, as such may respectively correspond to each request response. In the embodiment, the operating condition may be determined in a manner similar to that described with reference to step S204. In the embodiment, the operating condition may further be determined based on a communication capacity and availability of a client communication node in the environment. In the embodiment, the communication capacity and availability of a client communication node may be determined based on, for example, an operational or network status of the node, a communication queue length, a security or encryption level, an amount of resources such as network bandwidth available for communicating the requests, historical communication performance, and the like. The operating conditions associated with the client communication node may otherwise be determined with respect to any other type of operating status, workload condition, network condition, workload capacity, network capacity, or the like, as such may affect the operation of the application or node, accordingly.

At step S218, the collected and serviced transaction request responses may be grouped or aggregated with respect to a selected client communication node for handling and subsequent client communication. In an embodiment of the present invention, the client communication node may be selected based on a level of communication compatibility of the node, with respect to the transaction request characteristics common to the requests, as such may respectively correspond to the request responses. In the embodiment, the client communication node may be selected dynamically, based on the determined operating conditions of a cluster of one or more client communication nodes, as determined at step S216. The dynamic selection may be performed in a manner similar to that described with reference to step S206. In the embodiment, the one or more selected client communication nodes may include a communication capacity and availability suitable for respectively communicating the requests to the clients respectively associated with each of the requests, as such may be determined based on the determined operating conditions of the nodes at step S216. For example, the request responses may be grouped for individual communication by a specified client communication node based on a common transaction request characteristic associated with the request responses that may specify a particular level of encryption in communicating the request responses to the clients. In the embodiment, the request responses may be grouped with respect to one or more selected client communication nodes.

At step S220, the transaction request responses may be routed with respect to the selected client communication node for client communication. In an embodiment of the present invention, the grouped transaction request responses may be routed in a manner similar to that described with reference to step S208. In an embodiment of the present invention, the grouped transaction request responses may be routed in the environment with respect to a cluster of one or more nodes such as the client communication nodes.

Figure 3:
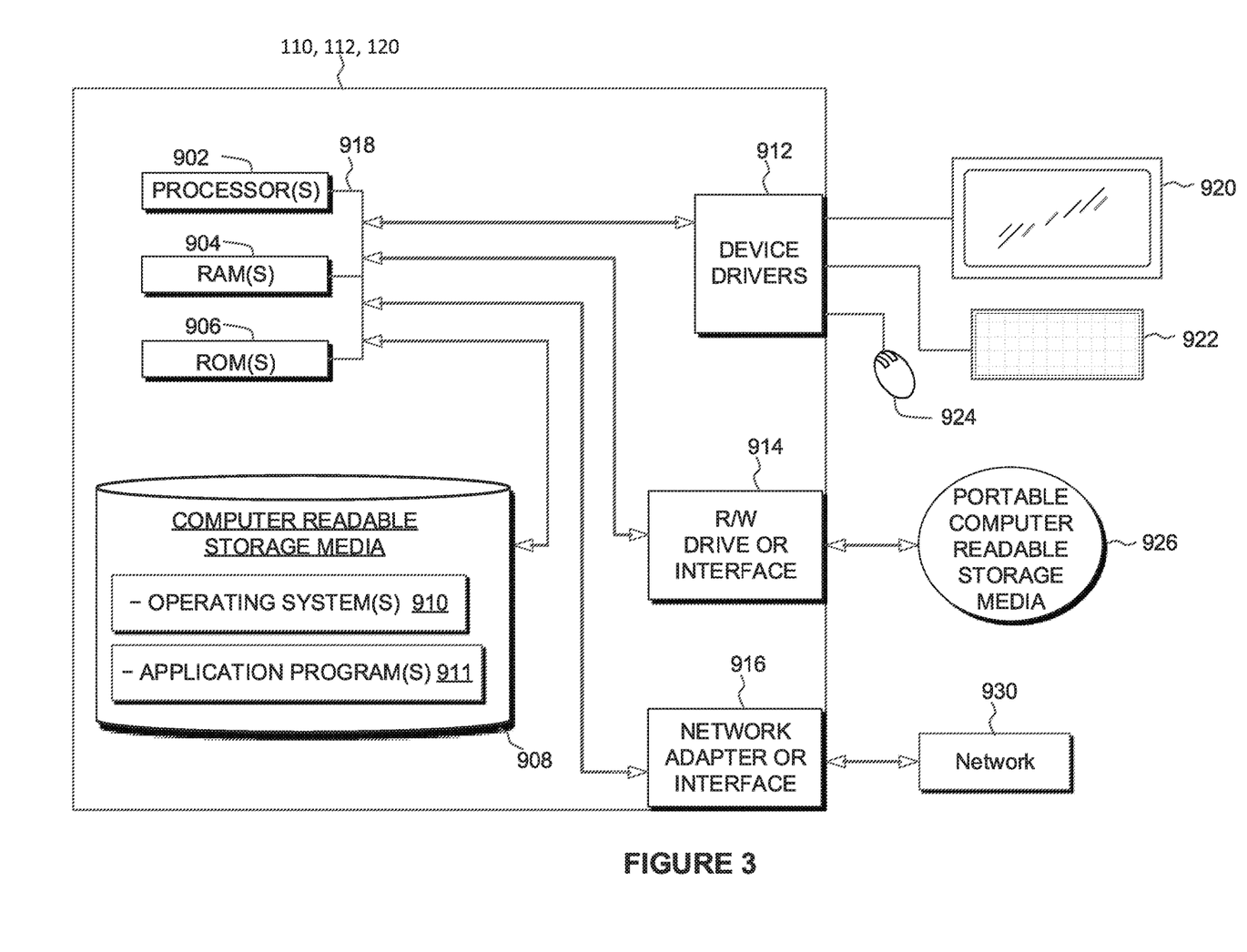
FIG. 3 is a block diagram depicting a client device, node device, and/or a transaction processing monitor device, in accordance with an embodiment of the present invention.

FIG. 3 is a block diagram depicting client device 110, node device 112, and/or transaction processing monitor device 120, in accordance with an embodiment of the present invention. As depicted in FIG. 3, client device 110, node device 112, and/or transaction processing monitor device 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as transaction processing monitor program 130 residing on transaction processing monitor device 120, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client device 110, node device 112, and/or transaction processing monitor device 120 may also include a R/W drive or interface 914 to read from and write to one or more portable computer readable storage media 926. Application programs 911 on client device 110, node device 112, and/or transaction processing monitor device 120 may be stored on one or more of the portable computer readable storage media 926, read via the respective R/W drive or interface 914 and loaded into the respective computer readable storage media 908. Client device 110, node device 112, and/or transaction processing monitor device 120 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. Client device 110, node device 112, and/or transaction processing monitor device 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

Transaction processing monitor device 120 can be a standalone network server, or represent functionality integrated into one or more network systems. In general, client device 110, node device 112, and/or transaction processing monitor device 120 can be a laptop computer, desktop computer, specialized computer server, or any other computer system known in the art. In certain embodiments, transaction processing monitor device 120 represents computer systems utilizing clustered computers and components to act as a single pool of seamless resources when accessed through a network, such as a LAN, WAN, or a combination of the two. This implementation may be preferred for data centers and for cloud computing applications. In general, client device 110, node device 112, and/or transaction processing monitor device 120 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
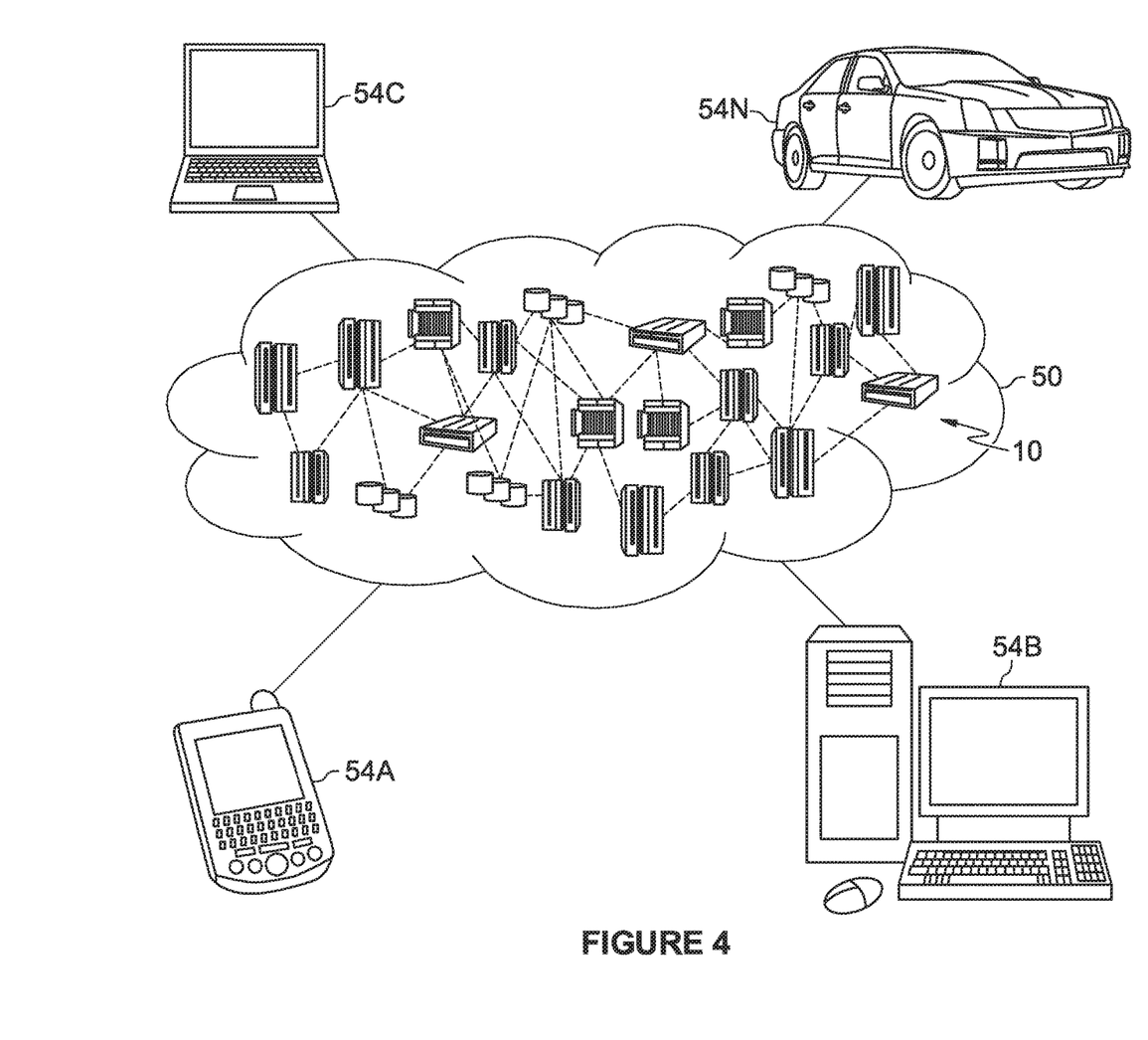
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
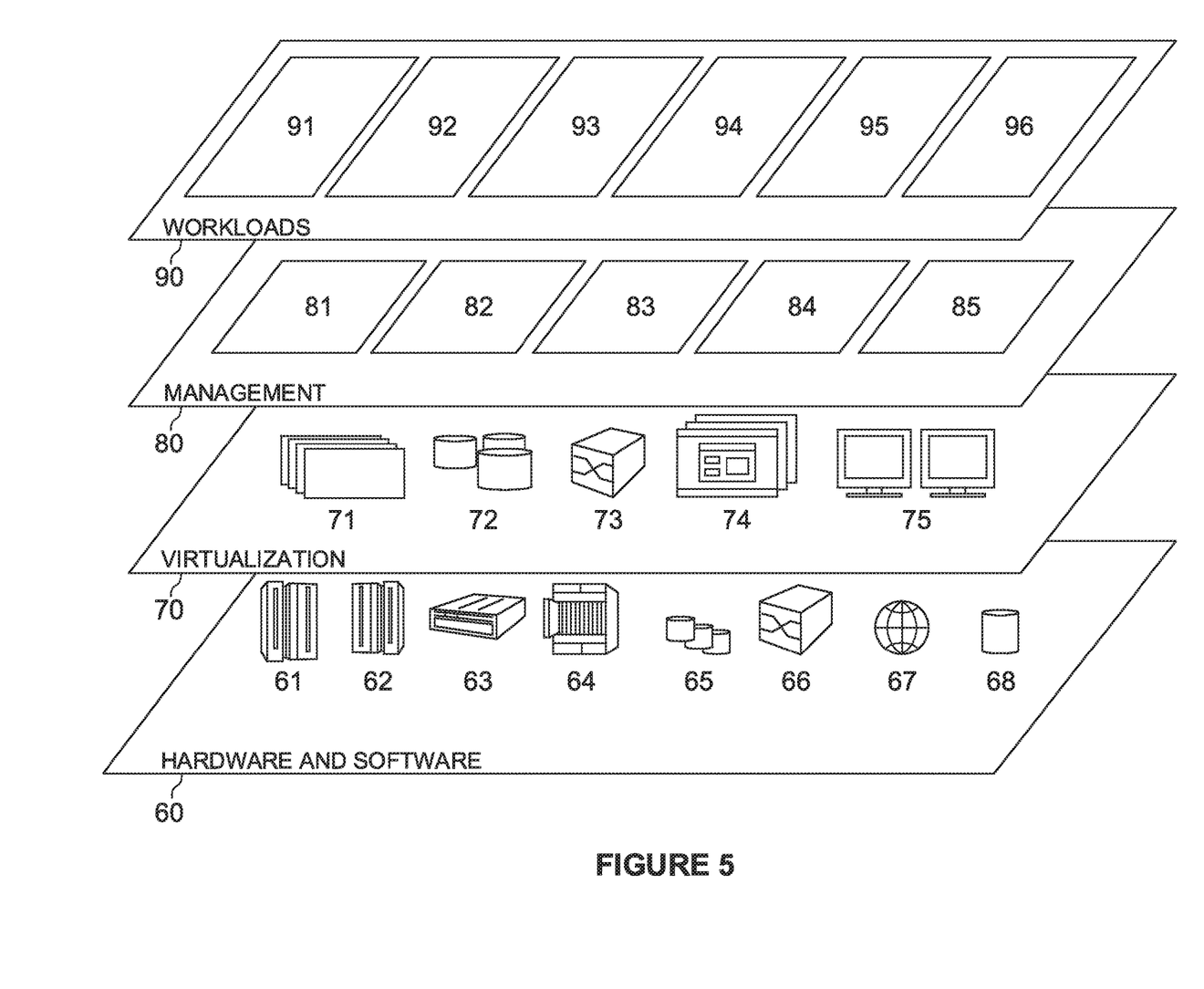
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96. Transaction process monitoring 96 may include functionality enabling the cloud computing environment for use and implementation in providing transaction process monitoring in and of a transaction processing system, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method for dynamic transaction request grouping and allocation in a transaction processing system, the method comprising:
   detecting similar transaction requests based on a number of transaction request characteristics common to each of the requests where the number exceeds a predetermined threshold, wherein the transaction request characteristic comprises a service level agreement by which a servicing or handling requirement is specified, and a transaction-oriented application required for servicing, each of the similar transaction requests respectively invoking a transaction-oriented application to service that similar transaction request and having a processing security level;
   as a result of detecting the similar transaction requests, determining operating conditions of one or more transaction servicing nodes in the system with respect to each of the requests with respect to the transaction request characteristics common to each of the requests, communication requirements, and servicing requirements, the one or more transaction servicing nodes configured to host the transaction-oriented application at the processing security level;
   grouping the similar transaction requests for servicing by the transaction-oriented application based on the transaction request characteristic and at least one of the determined operating conditions of each of the one or more transaction servicing nodes; and
   routing the grouped ones of the similar transaction requests with respect to the one or more transaction servicing nodes.

2. The computer-implemented method of claim 1, further comprising:
   scheduling transaction requests of the routed group of requests for sequential in tandem servicing by way of one or more of the transaction servicing nodes;
   collecting transaction request responses corresponding to each of the transaction requests upon servicing thereof;
   determining operating conditions of one or more client communication nodes in the system with respect to each of the collected transaction request responses;
   grouping the collected transaction request responses for communication, by one or more of the client communication nodes, to respectively associated clients of the transaction request responses, wherein the collected transaction request responses are grouped based on the transaction request characteristic corresponding to each respective transaction request response and a determined operating condition of each of the one or more client communication nodes; and
   routing the collected transaction request responses with respect to the one or more client communication nodes, wherein the collected transaction request responses are routed based on respectively corresponding transaction request identifiers of each of the transaction request responses.

3. The computer-implemented method of claim 1, wherein the operating conditions are determined for each transaction servicing node based on a current servicing capacity of that transaction servicing node.

4. The computer-implemented method of claim 1, wherein routing the grouped requests comprises associating a transaction request identifier with each individual transaction request, and associating a group identifier with the grouped requests.

5. The computer-implemented method of claim 2, wherein the operating conditions are determined for each client communication node based on a current communication capacity and availability of that respective client communication node.

6. The computer-implemented method of claim 2, wherein the transaction requests are scheduled based on the transaction request identifiers associated with each individual transaction request, the group identifier associated with the grouped requests, and the determined operating condition of one or more of the transaction servicing nodes.

7. The computer-implemented method of claim 2, wherein the transaction requests are scheduled to prevent context-switching by the transaction servicing nodes during servicing of the transaction requests.

8. A computer system for dynamic transaction request grouping and allocation in a transaction processing system, the computer system comprising:
one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
detecting similar transaction requests based on a number of transaction request characteristics common to each of the requests where the number exceeds a predetermined threshold, wherein the transaction request characteristic comprises a service level agreement by which a servicing or handling requirement is specified, and a transaction-oriented application required for servicing, each of the similar transaction requests respectively invoking a transaction-oriented application to service that similar transaction request and having a processing security level;
as a result of detecting the similar transaction requests, determining operating conditions of one or more transaction servicing nodes in the system with respect to each of the requests with respect to the transaction request characteristics common to each of the requests, communication requirements, and servicing requirements, the one or more transaction servicing nodes configured to host the transaction-oriented application at the processing security level;
grouping the similar transaction requests for servicing by one or more transaction-oriented applications based on the transaction request characteristic and at least one of the determined operating conditions of each of the one or more transaction servicing nodes; and
routing the grouped ones of the similar transaction requests with respect to the one or more transaction servicing nodes.

9. The computer system of claim 8, wherein the method further comprises:

scheduling transaction requests of the routed group of requests for sequential in tandem servicing by way of one or more of the transaction servicing nodes;
collecting transaction request responses corresponding to each of the transaction requests upon servicing thereof;
determining operating conditions of one or more client communication nodes in the system with respect to each of the collected transaction request responses;
grouping the collected transaction request responses for communication, by one or more of the client communication nodes, to respectively associated clients of the transaction request responses, wherein the collected transaction request responses are grouped based on the transaction request characteristic corresponding to each respective transaction request response and a determined operating condition of each of the one or more client communication nodes; and
routing the collected transaction request responses with respect to the one or more client communication nodes, wherein the collected transaction request responses are routed based on respectively corresponding transaction request identifiers of each of the transaction request responses.

10. The computer system of claim 8, wherein the operating conditions are determined for each transaction servicing node based on a current servicing capacity of that transaction servicing node.

11. The computer system of claim 8, wherein routing the grouped requests comprises associating a transaction request identifier with each individual transaction request, and associating a group identifier with the grouped requests.

12. The computer system of claim 9, wherein the operating conditions are determined for each client communication node based on a current communication capacity and availability of that respective client communication node.

13. The computer system of claim 9, wherein the transaction requests are scheduled based on the transaction request identifiers associated with each individual transaction request, the group identifier associated with the grouped requests, and the determined operating condition of one or more of the transaction servicing nodes.

14. The computer system of claim 9, wherein the transaction requests are scheduled to prevent context-switching by the transaction servicing nodes during servicing of the transaction requests.

15. A computer program product for dynamic transaction request grouping and allocation in a transaction processing system, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:
detecting similar transaction requests based on a number of transaction request characteristics common to each of the requests where the number exceeds a predetermined threshold, wherein the transaction request characteristic comprises a service level agreement by which a servicing or handling requirement is specified, and a transaction-oriented application required for servicing, each of the similar transaction requests respectively invoking a transaction-oriented application to service that similar transaction request and having a processing security level;

as a result of detecting the similar transaction requests, determining operating conditions of one or more transaction servicing nodes in the system with respect to each of the requests with respect to the transaction request characteristics common to each of the requests, communication requirements, and servicing requirements, the one or more transaction servicing nodes configured to host the transaction-oriented application at the processing security level;

grouping the similar transaction requests for servicing by one or more transaction-oriented applications based on the transaction request characteristic and at least one of the determined operating conditions of each of the one or more transaction servicing nodes; and routing the grouped ones of the similar transaction requests with respect to the one or more transaction servicing nodes.

16. The computer program product of claim 15, wherein the method further comprises:

scheduling transaction requests of the routed group of requests for sequential in tandem servicing by way of one or more of the transaction servicing nodes;

collecting transaction request responses corresponding to each of the transaction requests upon servicing thereof;

determining operating conditions of one or more client communication nodes in the system with respect to each of the collected transaction request responses;

grouping the collected transaction request responses for communication, by one or more of the client communication nodes, to respectively associated clients of the transaction request responses, wherein the collected transaction request responses are grouped based on the transaction request characteristic corresponding to each respective transaction request response and a determined operating condition of each of the one or more client communication nodes; and routing the collected transaction request responses with respect to the one or more client communication nodes, wherein the collected transaction request responses are routed based on respectively corresponding transaction request identifiers of each of the transaction request responses.

17. The computer program product of claim 15, wherein the operating conditions are determined for each transaction servicing node based on a current servicing capacity of that transaction servicing node.

18. The computer program product of claim 15, wherein routing the grouped requests comprises associating a transaction request identifier with each individual transaction request, and associating a group identifier with the grouped requests.

* * * * *